United States Patent [19]

Markham, Jr. et al.

[11] Patent Number: 4,828,577
[45] Date of Patent: May 9, 1989

[54] PROCESS FOR CONVERTING FOOD SLUDGES TO BIOMASS FUELS

[76] Inventors: William M. Markham, Jr., P.O. Box 685, Verona, Va. 24482; John H. Reid, 6 River Oak Pl., Fredericksburg, Va. 22401

[21] Appl. No.: 162,079

[22] Filed: Feb. 29, 1988

Related U.S. Application Data

[63] Continuation-in-part of Ser. No. 677,556, Dec. 3, 1984, Pat. No. 4,728,517.

[51] Int. Cl.$^4$ ............................ C10L 5/40; C10L 5/00
[52] U.S. Cl. .................................... 44/589; 44/605
[58] Field of Search ............ 44/589, 605, 628, 505, 44/590, 606

[56] References Cited

U.S. PATENT DOCUMENTS

| | | | |
|---|---|---|---|
| 2,861,877 | 11/1958 | Geraghty et al. | 71/13 |
| 3,910,775 | 10/1975 | Jackman | 44/589 |
| 4,026,678 | 5/1977 | Livingston | 44/589 |
| 4,203,376 | 5/1980 | Hood | 44/605 |
| 4,378,229 | 3/1983 | Leen | 44/605 |
| 4,492,171 | 1/1985 | Brashears et al. | 110/261 |
| 4,532,873 | 8/1985 | Rivers et al. | 110/347 |
| 4,538,530 | 9/1985 | Whitman | 110/260 |
| 4,546,710 | 10/1985 | Cremer | 110/263 |
| 4,565,137 | 1/1986 | Wright | 110/264 |
| 4,566,393 | 1/1986 | Connel et al. | 110/261 |
| 4,574,711 | 3/1986 | Christian | 110/264 |
| 4,589,355 | 5/1986 | Chastain et al. | 110/346 |
| 4,589,887 | 5/1986 | Aunsholt | 44/589 |
| 4,592,291 | 6/1986 | Sullivan, III | 110/346 |
| 4,599,954 | 7/1986 | Williams | 110/346 |
| 4,612,865 | 9/1986 | Nilsson et al. | 110/244 |
| 4,671,192 | 6/1987 | Hoffert et al. | 110/347 |
| 4,720,346 | 1/1988 | Flesher et al. | 210/734 |

OTHER PUBLICATIONS

"Flotation IPL Systems", brochure of Nijhus Water, P. O. Box 43, 7100 AA Winterswijk–Holland.

Primary Examiner—Carl F. Dees
Attorney, Agent, or Firm—Marion P. Lelong

[57] ABSTRACT

A process is described for treating a feed wastewater from a food preparation plant to recover substantially all of its fats and up to 50% of its proteins in a chemical float sludge which is selectively admixed with an absorptive bulking agent, such as sawdust, at a dry-basis weight ratio of 3–4 pounds of bulking agent to one pound of total sludge solids to produce a biomass mixture which is selectively dried and regulated in size to a maximum of ⅛-inch to produce a biomass fuel, characterized by a fuel value of approximately 11,000 Btu per pound, which is highly suitable for self-sustained burning in a gasifier-type suspension burner. After removal of the float sludge, the partially purified wastewater is aerobically treated with microorganisms to produce activated sludge, a selected portion thereof being recycled to the feed wastewater before admixing coagulation and flocculation chemicals therewith. Another selected portion of the activated sludge may also be admixed with the float sludge and the bulking agent. Waste activated sludge may be up to 50% of the total sludge solids on dry weight basis.

27 Claims, 1 Drawing Sheet

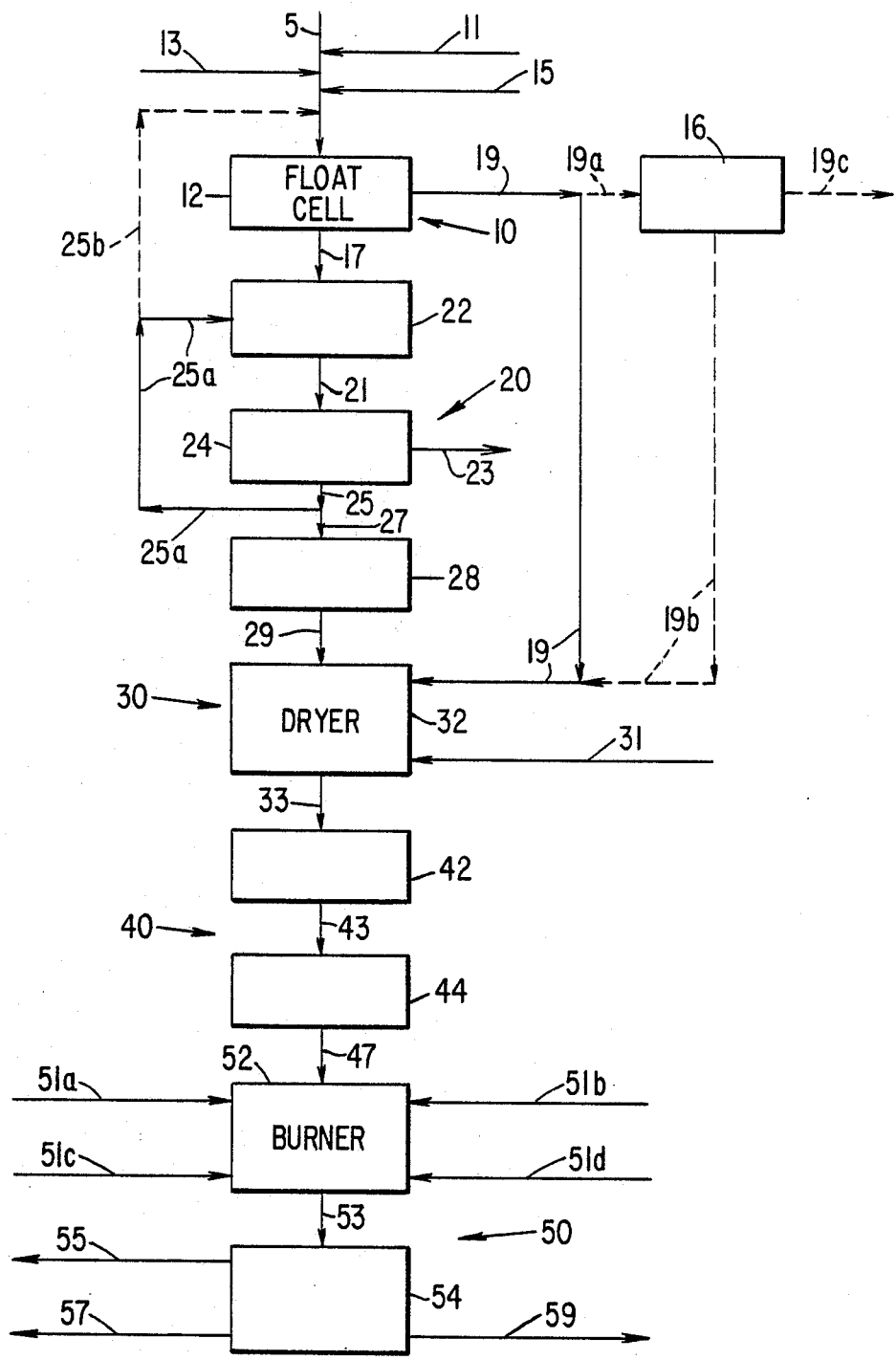

PROCESS FOR CONVERTING FOOD SLUDGES TO BIOMASS FUELS

This application is a continuation-in-part of co-pending application Ser. No. 677,556, filed Dec. 3, 1984, of William M. Markham, Jr. and John H. Reid, entitled "Conversion of Biological Float Sludge and Primary Float Sludge to Animal Protein Supplement", now U.S. Pat. No. 4,728,517.

BACKGROUND OF THE INVENTION

1. Field of the Invention

This invention relates to dewatering sludges, particularly sludges derived from food preparation. It also relates to processing such sludges for use as biomass fuels.

2. Review of the Prior Art

In fish canneries, red meat slaughter houses, and poultry slaughter and processing plants, large amounts of food wastewater, having high protein and fat contents, are produced. A poultry processing plant is believed to be typical of food preparation plants that produce large quantities of wastewater containing fat and protein. Using such a plant producing 500,000 gallons per day of wastewater as an example, the fat content of the wastewater is in its insoluble biochemical oxygen demand (BOD) fraction, and a greater part of the protein content is in its soluble BOD fraction. The fats are in the form of particles that would be separated from the wastewater in a filtration operation. Over an extended period, the insoluble fraction is fairly constant, but the soluble fraction is subject to wide variations caused by such routine process situations as emptying a scalder or a cook vat.

These meat wastewaters are commonly processed by: (a) pretreatment of the wastewaters in a float cell by use of a dissolved air flotation process which is operated with or without chemical coagulants and flocculants and which produces a primary float sludge or skimmings and a partially purified wastewater and /or (b) biological oxidation of the meat wastewaters or of the partially purified wastewater under facultative or aerobic conditions in an aerobic treatment plant, such as a barrier oxidation ditch, or biological reduction or fermentation under anaerobic conditions to produce biological sludges.

Biological sludges are defined herein as those sludges produced by conversion of carbonaceous, proteinaceous, and fatty matters and/or sugars and carbohydrates to biological solids (microorganisms including bacteria, fungi, protozoa, rotifers, and the like) by biological oxidation under facultative or aerobic conditions to create activated sludge or by biological reaction or fermentation under anaerobic conditions to create anaerobic sludge. Biological sludges include municipal or sewage sludge which is relatively easy to dispose of by land application or by drying and landfilling.

It should be understood that all of the wastewater can be fed to the oxidation ditch, but the very high biological oxygen demand (BOD) created by fats makes it desirable to remove the fats by treating the wastewater in a flotation cell which produces a float sludge and a purified wastewater which is fed to the oxidation ditch. If no chemicals are employed in the float cell, a "roughing sludge" is produced; it contains a portion of the fat and a sufficient portion of the protein that it is subject to the same wide variations as the wastewater itself.

Addition of chemical coagulants and flocculants in the dissolved air flotation process is preferred because these additives float additional proteins from the wastewater. When chemicals (coagulation agents and flocculation agents) are employed, nearly all (98%) of the insoluble fraction and a variable portion of the soluble fraction, depending upon the nature and amount of the added chemicals, are separated in the chemical float sludge that is produced. Without such chemicals, the float sludge has a fat content of up to 75% by weight and more on a dry basis; with the chemicals, the protein content is increased and the weight percentage of fat is lowered, but recoveries vary greatly between plants.

The chemical float sludge produced by dissolved air flotation with added chemical coagulants and flocculants from wastewater produced by pure poultry slaughtering operations, for example, is a complex substance which contains approximately 30-40% protein, 5-12% ash and fiber, and 40-50% fat on a dry basis and has a solids content ranging from 5% to 30% but normally averaging about 10-15%.

In a pure further processing poultry plant, particularly if it contains a bread line, there is so much flour and so little protein in the wastewater that the protein content of its float sludge may be as low as 3% by weight. Generally, float sludge produced by such a further processing process has 5-20% protein, about 5% ash and fiber, and 40-65% fat, depending upon use of oil frying and the like. Further processing is now being incorporated increasingly in poultry slaughtering plants.

The high fat content complicates the disposal process and increases its cost. A poultry slaughtering plant handling 70,000 birds per day (17,500,000 birds per year) produces 2,200-2,500 gallons per day (5000,000 gallons per year) of this float sludge which typically has a 12-15% solids content and costs $0.02-0.05 per gallon for disposal. This yearly disposal cost for float sludge is therefore $11,000 to $27,500 per year.

A poultry processing plant of this size additionally produces activated biological sludge from aerobic processing, such as in an oxidation ditch, of its partially purified wastewater which is fed from its float cell after skimming off the float sludge. A portion of the activated sludge is returned to the aerobic treatment basin (e.g., a barrier oxidation ditch), and the remaining portion (the waste activated sludge, WAS) is thickened in a suitable manner from 1-2% solids content to 6-7% solids content. The thickened WAS is generally sent to a sludge disposal site.

Because poultry processing plants are generally run on a single-shift, five-day-per-week basis, the chemical float sludge (CFS) is also produced on this basis, but the waste activated sludge (WAS) is produced seven days per week in the amount of approximately 4,000 gallons per day at 1% solids and 1,300-800 gallons per day of thickened sludge at 3-5% solids after passage through a flotation thickener.

In some plants, the WAS is stored from Monday through Friday and is then thickened over the weekend in the same float cell in which the raw wastewater is treated during the work week. Before thickening, it is similar to municipal or sewage sludge in many respects, such as having a low solids content of 2-8% by weight.

If this float sludge is hauled in a tank truck to a land disposal site, spread on the land, and plowed under, the disposal cost is $30 to $50 or more for each 2,000 gallons of activated sludge. The annual cost of disposing of this thickened activated sludge is $4,300–$7,200. Thus the combined costs of disposing of both float and activated sludges are $16,300 to $34,700 per year.

In a poultry processing plant, a rendering plant is used to process feathers, heads, feet, and other separated parts of the poultry carcass, characterized as "offal", into animal feed by "cooking" the material in a rotating drum-type dryer heated by steam in its shell to a temperature of about 240° F. Such a dryer, known as a Duppes cooker, contains paddles, aligned at an angle to its axis, that push material from one end to the other. Float sludge is sometimes admixed with offal to produce a feed mixture for the rendering plant, but the mixture creates a gummy coating in the cooker, adds free fatty acids to the rendering products, and discolors these products.

As a method for compensating for surges in wastewater flow rate and in the insoluble fraction thereof and especially for equalizing dumps and spills from the rendering plant, it is possible to provide a sufficiently long equalization time by means of a holding tank within which the flow of float sludge can accumulate. For a poultry processing plant producing 2,500 gallons per day of float sludge, a 20,000 gallon holding tank would be required. Disadvantages of this method, however, include the high capital cost of the large tank and odor production; in summer, odor can develop within 24 hours. Accordingly, another and more practical surge-compensation method must be provided.

In co-pending Application Ser. No. 06/677,556, now U.S. Pat. No. 4,728,517 a process is provided in which float sludge, with or without activated biological sludge, is dewatered and defatted to provide a proteinaceous meal, which is suitable for animal food, and fat-impregnated chips, which are an excellent fuel source. Such chips can be readily burned in the cyclone furnace described in U.S. Pat. No. 4,612,865 which comprises a generally cylindrical and horizontal combustion chamber closed at one end and having at least one inlet opening for fuel and air, an outlet at the opposite end, and an ash discharging opening at its bottom and near its end wall. An ash discharge conduit conducts ash to an ash bin.

Such chips can also be burned by using the pressurized cyclonic combustion method and the cylindrical burner apparatus disclosed in U.S. Pat. No. 4,671,192 which produces a clean pressurized effluent gas. In the burner, particulate solids such as wood chips are fed tangentially into a primary combustion chamber at its inlet end and flow at high tangential velocity in a helical path through the burner.

A useful burner head for combusting solid fuels such as straw, peat, chips, and coal is disclosed in U.S. Pat. No. 4,546,710. The burner head comprises two pipes located concentrically to each other, the gap between the pipes being in communication with a supply source for combustion air and in communication with the inner pipe via two radially arranged sets of apertures in the wall thereof. The first set is located a sufficient distance from the charging opening to form a first combustion zone in which the fuel is incompletely burned, and the second set is located closer to the discharge opening to form a second combustion zone in which gases from the first zone are burned completely.

Even though these burners are satisfactory for burning the fat-impregnated chips produced by the process of co-pending Application Ser. No. 06/677,556, now U.S. Pat. No. 4,728,517 they are economically unsatisfactory because they are too big to fit into the standard boiler shell for bilers of less than 700 horsepower and especially of 250–400 horsepower and consequently have to be fitted into boilers constructed on site. For a 400-horsepower installation, for example, the costs are 3–4 times the cost of a packaged Scotch-type boiler.

This horsepower criterion is important because food preparation plants of the poultry, red meat, seafood, and like industries are seldom extremely large. Their power needs are generally within the range of 250–300 horsepower. Most of the power boilers and burners that have been developed for burning fuel wastes require such large dilution ratios, such as 10:1 of sawdust:sludge on dry weight basis for a cascade grate burner, for example, that energy well in excess of this range, such as 800–1,000 horsepower, is produced, and expensive co-generation facilities are required in order to be able to sell the additional power. The total cost of such an installation is within the range of 1.5 to 2.0 million dollars at the present time. However, the owners of many food preparation plants can not afford to spend such a large amount of money and have no desire to engage in electrical power production.

There is accordingly a need for a process that produces a proportionately smaller quantity of high-energy biomass fuel that is suitable for a gasification-type suspension burner while adequately disposing of the food preparation plant's entire output of wastes. Such a process must be able to dispose of more sludge per generated horsepower and per unit cost of installed facilities than the prior art facilities which are currently available.

Doing so requires utilizing an absorptive bulking agent that is capable of absorbing a relatively large amount of fat from the float sludge in order to minimize dilution of the high Btu value of the fat. It also requires that both the float and waste activated sludges be dried to within a selected range of moisture content in spite of large daily and even hourly fluctuations in wastewater flow rate and in moisture content and fat content of the float sludge.

However, the suspension burner, developed for burning sawdust, can burn such particulate fuels with high efficiency and flexibility and is available in smaller sizes having outputs within the desired range for poultry processing plants. The particle size of such particulate fuels is generally in the range of no more than ⅛ inch.

U.S. Pat. No. 4,565,137 describes a biomass suspension burner for use with furnaces or boilers which has a delivery system for injecting particulate fuel into a combustor, a means for introducing a primary air steam to mix with and conduct fuel into the combustor, and a means for introducing secondary air tangentially to maintain a cyclonic vortex. When the burning, gasified fuel exits the combustor through a nozzle, quartiary air is introduced to burn the gas. Proper flame stability, gasification, and ash fusion are achieved by regulation of the air streams.

U.S. Pat. No. 4,566,393 describes an apparatus having a waste burner for burning woodwaste products, such as wood shavings, wood chips, and sawdust. The burner includes an elongated cylinder having a length substantially larger than its diameter so that the fuel can be heated to a sufficient temperature to pyrolyze volatiles and initiate combustion in the cylinder. A woodwaste burner apparatus receives unburned fuel and combustion products from the burner.

A burner for use in burning granulated solid fuel is disclosed in U.S. Pat. No. 4,574,711. The burner includes a burner head having a combustion chamber and inlet and outlet openings at opposite ends thereof and in communication with the chamber. Granulated solid fuel and primary combustion air are delivered to the inlet opening. The primary air is preheated by movement along the the burner head prior to entering the inlet opening. A retention barrier within the combustion chamber retains fuel particles larger than a predetermined size in the combustion chamber to insure complete incineration thereof.

A particulate waste product combustion system is described in U.S. Pat. No. 4,589,355 which provides controlled incineration of agricultural waste products for utilization of the ash residue and gaseous exhaust.

Other useful apparatuses for burning particulate biomass fuels are described in U.S. Pat. Nos. 4,492,171, 4,671,192, 4,566,393, 4,612,865, 4,538,530, and 4,546,710.

Methods and apparatuses for directly treating sewage sludge to form a fuel therefrom are also available, such as U.S. Pat. No. 4,378,229 which discloses a method for treating sewage in which the combustible components of the sewage are separated from the sewage and utilized as a primary fuel. Separation is done by skimming screened sewage to collect the scum which comprises oils, greases, fats, water, and intermixed solid material. The scum is maintained in a quiescent and substantially nonagitated state for at least twelve hours, during which the combustible oils, greases, fats, and the like are rendered separable from the other components of the scum. Then the fats, oils, greases, and the like are separated from the water and solid material and burned as a primary fuel.

U.S. Pat. No. 4,532,873 discloses a method for preparing hog fuel, other biomass, or peat for efficient burning and heat recovery in a water-wall boiler by drying the fuel to less than 30% moisture content, then pulverizing it to an upper particle size such that all particles will burn in air suspension within the combustion zone and the boiler can meet emission requirements. The pulverizing step is also adjusted so that a fines portion of the fuel is created of such size and in such amount that this fines portion readily self-ignites upon flame initiation, providing sufficient ignition energy that the entire flow of fuel burns without needing conventional fossil fuel support or pilot. A suitable particle size range was found to comprise 65-100% less than 1000 microns and 15-85% less than 150 microns.

U.S. Pat. No. 4,592,291 describes separating sewage sludge from sewage liquid, dewatering and compressing the sludge, subjecting the sludge to microwave radiation to reduce sludge to ash-like residue, and adding the residue back to the sewage liquid.

To prevent plugging of a sludge drying apparatus by the very sticky mass of thickened sludge, U.S. Pat. No. 4,599,954 discloses a process for disposal of wet sewage sludge by admixing a particulate material having Btu values, feeding the mixture to a grinding or milling apparatus in which the particulate material acts to prevent the sewage sludge from caking in the apparatus during the grinding or milling thereof, supplying hot gases to dry the mixture while recirculating a portion of the hot mixture, and disposing of the ground or milled mixture by burning thereof.

If the float and WAS sludges are mixed with sawdust, partially dried to obtain a material that can be spread on farmland, as taught in U.S. Pat. No. 2,861,877, and allowed to remain overnight in the sealed, hot dryer, there may be instant ignition of the gas within the dryer when air is admitted thereto.

If such a partially dried sludge/sawdust mixture is passed through a size-reduction apparatus, such as a hammermill and a screen, a thick, black, gummy material is likely to ooze out of the mixture as it is heated during the size-reduction treatment. If the mixture is fed to a burner after size reduction, such oozing is additionally or alternatively likely to occur there.

Yet when the ratio of biomass material to float sludge (dry basis) is excessively minimized, it has been found by experimentation that a black, shiny, gummy material (almost like tar) is exuded that clogs screens and conveyors before the fuel reaches the burner. Conversely, if the ratio of absorptive bulking agent to float sludge is too great, the burner declines in heat output so that it loses efficiency and can even be incapable of being self sustaining without addition of a support fuel such as natural gas. Similarly, if WAS is entirely substituted for float sludge in such a biomass fuel mixture, the Btu value may be come insufficient in relationship to air input to maintain the flame. On the other hand, if the proportion of float sludge to absorptive bulking agent is too great, the entire burner may be melted down unless the ratio of air input to biomass fuel mixture is suitably and promptly changed.

On the other hand, if $\frac{1}{8}$-inch sawdust, as an exemplary bulking agent, is mixed with a little too much float sludge, it has been discovered that wet and greasy masses of sludge and sawdust, termed "grease balls", are formed within the dryer. These grease balls cannot be easily broken apart and require additional drying time; once they have dried to a certain moisture content, however, they break apart readily.

SUMMARY OF THE INVENTION

It is accordingly an object of this invention to provide a process for burning float and activated sludges produced by a food preparation plant having fatty wastes.

It is another object to provide a process for admixing float sludge with an absorptive bulking agent to prepare a biomass fuel mixture that is readily burnable in gasifier-type burners on a self-sustaining basis.

It is a further object to provide a process that is capable of compensating on a routine basis for hourly and daily surges in float sludge output rate and in fat content of the float sludge.

It is an additional object to increase the fuel value of a bulking agent, such as sawdust, to a Btu content at least as great as that of natural gas.

In accordance with these objects and the principles of this invention, a process has surprisingly been developed for producing a biomass fuel of a quality that is suited for self-sustained burning in a gasifier-type suspension burner and that requires considerably less dilution than comparable mixtures of the prior art so that it burns with higher efficiency than natural gas. This process comprises:

A. feeding wastewater, containing protein in a soluble fraction and fat in an insoluble fraction, from a meat processing plant to a float cell;

B. selectively adding chemicals and compressed air to the float cell to obtain partially purified wastewater and chemical float sludge (CFS) having a solids content of at least about 10% by weight and containing nearly all of the fat and up to 50% by weight of the protein;

C. biologically oxidizing the partially purified wastewater to obtain waste activated sludge (WAS) containing approximately the remainder of the protein and fat and having a solids content of 6–7% by weight;

D. selectively admixing the float sludge, 0–50% of the waste activated sludge, and a selected bulking agent having a moisture content of about 25–30% by weight;

E. selectively drying the resulting biomass mixture to a moisture content of about 10–12% by weight;

F. selectively reducing the particle size of the dried mixture to a maximum size of about ⅛ inch; and G. feeding the biomass fuel mixture to a suspension burner of the gasifier type.

In more detail, this process comprises the following steps:

The flotation and coagulation chemicals are added to the feed wastewater before addition of air under pressure. Additionally, as taught in Ser. No. 06/677,556, now U.S. Pat. No. 4,728,517 a portion of the WAS is preferably recycled to the wastewater before addition of the coagulation and flotation chemicals. In general, 3–6% of activated sludge at 1% solids is preferably admixed with the food wastewater before adding the chemicals. On a dry solids basis, the activated sludge is preferably at least 15% by weight of the combined float sludge produced by the float cell. Additional waste activated sludge (WAS), however, may be added to the dryer as long as the 50 weight per cent limitation on total WAS content is observed. On a solids basis, the float sludge and the portion of the waste activated sludge that is used for the process of this invention are herein defined as the isolated wastewater solids.

The preferred biomass material used as the absorptive bulking agent is sawdust and especially finishing cut sawdust which requires very little size regulation. Coarser wood material, such as wood chips, can be used, but at least a portion of the particles larger than ⅛ inch ends up in the ash. Other examples of organic bulking agents are wood shavings, shredded cardboard, shredded newspaper, whole or broken corn cobs, bark, peanut hulls, rice hulls, soybean hulls, paunch manure, some types of nut hulls, and cloth scraps if made of absorptive fibers such as cotton, linen, and wool.

If the dried-and-screened wood chips of Ser. No. 06/677,556, now U.S. Pat. No. 4,728,517 are used as the bulking agent of Step D, they become also the mixture of Step D. These chips can be put through a double hog and then through Steps E and F to obtain the high-energy biomass fuel of this invention for a gasifier-type suspension burner, while all of the protein in the wastewater that has not been biologically oxidized is utilized as an animal feed. The first hog should take the chips down to ½-inch size; the second hog should take the ½-inch size particles down to ¼-inch size for feeding to the hammermill or other size-reduction apparatus.

The waste activated sludge and the soluble fraction in the float sludge are relatively low in fat and high in protein and carbohydrate; these components create a fuel value not far from that of the bulking agent. From the standpoint of fuel preparation, the protein and carbohydrate can be considered to be "inert" in the sense that they produce no more But than cellulose. Consequently, the soluble fraction and the WAS function as a buffer to the heat-generating effect of the insoluble fraction when there are surges in the wastewater flow rate and/or the insoluble fraction thereof, as when the rendering plant dumps 200 gallons of fat into the wastewater system. However, if too large a quantity of WAS is admixed in the dryer, no harm is done unless the amount of fat is so low (e.g., below 6%) that the burner output drops to a level too low for self-sustained burning. Even this effect can be compensated for by promptly decreasing the air inflow rate. On the other hand, adding no WAS has no more effect on heat output than lowering the amount of bulking agent.

The size reduction apparatus is preferably a hammermill having a screen for rejecting oversize material. A roller-type pug mill is a feasible alternative. As another alternative, prescreened sawdust can be used, followed by breaking up and screening lumps that are discharged by the dryer. As another size-regulating method, a shaker screen can be utilized, with oversized material being recycled to the dryer. The same problems from flowing fat can occur, however, with any sawdust size-regulation means.

If the bulking agent is a woody material such as sawdust, the Btu content of the biomass fuel mixture is increased to 11,000 Btu/pound when the moisture content is 10–12%, as compared to 9,600–9,700 Btu per pound for wood. This high Btu content enables the biomass fuel to burn as a self-sustaining fuel in a suspension burner without impeding the essential function of disposing of expensive waste materials, and addition of WAS enables irregularities in fat input to be easily compensated for; yet the wide range of allowable WAS addition obviates criticality in the process.

BRIEF DESCRIPTION OF THE DRAWING

The FIGURE is a schematic flowsheet which shows the steps of the invention for controlling chemical float sludge (CFS) and waste activated sludge (WAS) production, selectively controlling the solids and moisture contents thereof, admixing the sludges with selected quantities of a selected bulking agent having a selected moisture content, drying the mixture, regulating its maximum size, and delivering the dried biomass fuel to the burner.

DESCRIPTION OF THE PREFERRED EMBODIMENTS

Referring to the Figure, wastewater stream 5 from a meat processing plant is continuously admixed with a solution 11 of a flocculation chemical, a solution 13 of a coagulation chemical, and a stream 15 of compressed air. The mixture is fed to one end of a flotation tank or float cell 12 which is at atmospheric pressure and has a skimming means. Within tank 12, which is part of a flotation cell assembly 10, the compressed air is released from solution as numerous very tiny bubbles.

As is known in the art, insoluble fat globules and a selected portion of the soluble fraction (largely blood) become attached to the bubbles as they rise to the surface, where the air escapes and the attached insoluble and soluble materials agglomerate to form a glutinous brown sludge blanket which is skimmed from the surface and discharged as a stream of float sludge 19 while the partially purified wastewater, beneath the sludge blanket, is discharged from the other end of tank 12 as wastewater stream 17 and fed to a suitable type of aerobic wastewater treatment system, such as a barrier oxidation ditch assembly 20.

Ditch assembly 20 comprises a barrier oxidation ditch 22, a clarifier 24, and a thickening device 28. Ditch 22 comprises an endless channel containing translationally flowing mixed liquor and a means for dissolving air in the liquor at least once per cyclic flow of the liquor.

The microorganisms in the mixed liquor convert the soluble material in the wastewater into biomass in the form of additional microorganisms, which are denser than water. A stream 21 of the mixed liquor is fed continuously to clarifier 24 wherein the microorganisms settle and are withdrawn as a stream 25 of activated sludge having a solids content of 1-2 weight per cent. The clarified liquor, above the blanket of settled sludge, is discharged as clarified liquor stream 23 to be disinfected and fed to a lake or river.

A portion of sludge stream 25 is diverted to the channel of oxidation ditch 22 as return sludge stream 25a in order to maintain its working population of microorganisms. The remainder is sent, as WAS stream 27, to a thickening device 28, where its solids content is increased from 1-2% solids to 6-7% solids by weight. The thickened waste activated sludge is fed to dryer 32 of dryer assembly 30 as stream 29.

A stream 19 of float sludge from flotation tank 12 is also fed to dryer 32 of dryer assembly 30. If stream 19 has a total solids content (fat+protein) within the range of 12-30% by weight, it is acceptable.

If it is less than 12%, such as within the range of 5-12%, it is diverted as stream 19a to a thickening device, such as decanter 16. Within decanter 16, a cationic polymer of heavy molecular weight is admixed with the sludge. The mixture is settled for approximately 2 hours to form a heavy bottom layer of WAS and float sludge, a middle layer of water, and a top layer of sludge. The water is withdrawn as stream 19c, and the sludge layers are combined and sent to dryer 32 as thickened sludge stream 19b.

Additionally, a stream 31 of sawdust of approximately 25-30% moisture content is fed to dryer 32. Float sludge stream 19 or 19b and WAS stream 29 are the isolated wastewater solids which must be admixed with the bulking agent, such as sawdust stream 31, at 3-4 pounds of bulking agent per pound of isolated solids. All three streams 19 or 19b, 29, 31 are admixed and dried within dryer 32 by heat from steam within its shell at 240° F. for approximately 2-½ to 5-½ hours to a moisture content of 10-12% by weight.

The dried sludge/biomass mixture is discharged from dryer 32 to a size regulating apparatus 40 which comprises a hammermill 42 and a screen 44. Within hammermill 42, heat is generated as the sawdust particles and grease balls, if present, are disintegrated to a maximum size of about ⅛ inch. The dried mixture in particulate form then flows as stream 43 to screen 44, wherein particles of excessive size are retained and then returned to hammermill 42. However, if excessive fat is present, a black, thick, gummy liquid may flow from hammermill 42 and cause clogging of screen 44.

Biomass fuel stream 47 next flows from screen 44 to burner 52 of burner/boiler assembly 50. Stream 47 is of a quality that is suited for self-sustained burning in burner 52 which is a gasifier-type suspension burner. It contains no more than about four pounds of bulking agent per pound of isolated solids, i.e., the dry solids in stream 19 or 19b and in stream 29.

In burner 52, mixture stream 57 is heated under substantially anaerobic conditions so that its volatile matter liberates combustible gases, leaving a carbonaceous residue. Then primary, secondary, tertiary, and quartiary streams of heated air 51a, 51b, 51c, and 51d, which have been selectively heated inceramic passageways surrounding the combustion space of burner 52, are selectively fed into the combustion space to provide the desired fuel:air ratio and burner temperature. The mixture of burning carbonaceous particles and gases is then fed as stream 53 to boiler 54 in order to heat water and provide steam 55. The combustion gases pass up the stack as gas stream 57 at a temperature of about 450° F. The residue, a valuable ash having a $K_2O$ content of about 16% by weight, is discharged as ash stream 59. It has utility as a garden fertilizer.

The invention may be more thoroughly understood by means of the following examples, furnishing moisture content and fat as percentages by weight, compactability as the milliliters occupied by a fresh grab sample of 2 ounces in a one-liter graduate cylinder under a weight of 2 ounces, and flowability as the angle in degrees at which a sample of 2 ounces flowed down a smooth surface and over a dowel of ⅜ inch diameter. Moisture content was determined by drying a grab sample of stream 47 in an oven at 102° C. The results are given in the following table.

| Example No. | Fat, % | Moisture Content, % | Compactability ml | Flowability, o |
|---|---|---|---|---|
| 1 | 13.38 | 8.83 | 192 | 24 |
| 2 | 22.12 | 16.84 | 198 | 20 |
| 3 | 23.83 | 7.21 | 194 | 26 |
| 4 | 30.04 | 7.79 | 144 | 35 |
| 5 | 28.40 | 4.58 | 154 | 43 |
| 6 | 28.79 | 4.45 | 170 | 32 |

At the time that the sample of Example 1 was taken, the process was running well in every respect.

At the time of taking the sample of Example 2, burner 52 was operating at the upper limit of what it would accept as to moisture content. The feed material was not burning completely, and smoke was being exhausted from the stack.

At the time that the sample of Example 3 was taken, burner 52 was operating at the upper limit of acceptable fat; it was unable to handle the feed continuously. The process had to be stopped every 4-6 hours for cleaning screens 44.

At the time that the sample of Example 4 was taken, burner 52 was also having difficulty, and the process had to be stopped more frequently.

At the time that the sample of Example 5 was taken, burner 52 also appeared to be operating at the upper limit of fat acceptability.

At the time that the sample of Example 6 was taken, flow had to be stopped every 2 to 2-½ hours because screens 44 were plugging.

The compactability and flowability tests that were run for Examples 1-6 were devised in the belief that susceptibility to compaction and ability to flow were certain to be related to the unknown but evidently critical variables determining the processing and burning performances of the biomass fuel. However, it is apparent that correlations among these variables are very poor indeed. Thus the method of this invention has been solely defined with regard to operating limits.

On an occasion when the process was operating within desirable limits for fat, moisture, and solids contents and was running well, as in Example 1, an efficiency test was run. It was surprisingly discovered that burner/boiler assembly 50, while burning the biomass fuel of this invention, was operating with greater efficiency than any of the four nearby boilers of approximately equal capacity which were burning natural gas.

Because it will be readily apparent to those skilled in the wastewater treatment art that innumerable variations, modifications, applications, and extensions of the principles of this invention as hereinbefore set forth can be made without departing from the spirit and the scope of the invention, what is defined as such scope and is desired to be protected should be measured, and the invention should be limited, only by the following claims.

What is claimed is:

1. A process for treating wastewater from a food preparation plant containing fat and protein to produce a biomass fuel of a quality that is suited for self-sustained burning in a gasifier-type suspension burner and that comprises, on a dry basis, no more than about four pounds of bulking agent per pound of isolated wastewater solids.

2. The process of claim 1, wherein said biomass fuel contains 6–22% fat by weight.

3. The process of claim 2, wherein said isolated solids comprise chemical float sludge at a solids content of at least about 10% by weight.

4. The process of claim 2, wherein said float sludge contains substantially all of said fat.

5. The process of claim 3, wherein said float sludge additionally comprises up to 50% by weight of said protein.

6. The process of claim 2, wherein said biomass fuel has a moisture content of up to about 15% by weight.

7. The process of claim 4, wherein said biomass fuel has a moisture content of 10–12% by weight.

8. The process of claim 4, wherein said isolated solids comprise waste activated sludge at 0–50% by weight.

9. The process of claim 5 which further comprises thickening said waste activated sludge from 1–2% by weight to about 6–7% by weight.

10. The process of claim 5 which further comprises recycling a portion of said float sludge to said wastewater, before addition of coagulation and flocculation chemicals thereto.

11. A process for producing a biomass fuel that is capable of self-sustained burning in a gasifier-type suspension burner from a feed wastewater produced by a food preparation plant, said wastewater containing fats in an insoluble fraction and protein in a soluble fraction thereof, comprising the following steps:

A. adding flotation and coagulation chemicals to said feed wastewater in such quantities that all of said insoluble fraction and at least 25% of said soluble fraction are removed in said float sludge to produce partially purified wastewater;

B. feeding said partially purified wastewater to an aerobic treatment system to produce waste activated sludge;

C. thickening a selected portion of said waste activated sludge from a solids content of 1–2% to a solids content of 6–7% by weight;

D. on dry weight basis, admixing 3–4 pounds of an absorptive bulking agent to one pound of sludge solids to obtain a biomass mixture having 6–22% fat, said sludge solids being 0–50% waste activated sludge;

E. drying said biomass mixture to a moisture content of up to 15%;

G. regulating the size of particles in said dried biomass mixture to no greater than about ⅛ inch; and H. conveying said dried and size-regulated biomass mixture to a suspension burner of the gasifier type.

12. The process of claim 11, wherein said solids content of said float sludge is less than 5% total solids, and wherein said float sludge is thickened to at least 10% total solids.

13. The process of claim 11, wherein said dried biomass mixture has a moisture content of 8–12%.

14. The process of claim 11, wherein said dried biomass mixture has a moisture content of about 10%.

15. The process of claim 11, wherein said coagulation and flocculation chemicals are added in sufficient quantity that up to 50% of said soluble fraction is recovered in said float sludge.

16. The process of claim 15, wherein a selected portion of said waste activated sludge is recycled to said feed wastewater before adding said chemicals thereto.

17. A biomass fuel of a quality that is suited for self-sustained burning in a gasifier-type suspension burner and that comprises, on dry basis, no more than about four pounds of bulking agent per pound of isolated wastewater solids.

18. The biomass fuel of claim 7 which contains 6–22% fat by weight.

19. The biomass fuel of claim 18, wherein said isolated solids comprise chemical float sludge at a solids content of at least about 10% by weight.

20. The biomass fuel of claim 19, wherein said float sludge contains substantially all of said fat.

21. The biomass fuel of claim 19, wherein said float sludge additionally comprises up to 50% by weight of said protein.

22. The biomass fuel of claim 18 which has a moisture content of up to 15% by weight.

23. The biomass fuel of claim 22 which has a moisture content of 8–12% by weight.

24. The biomass fuel of claim 17, wherein said isolated solids comprise waste activated sludge at 0–50% by dry weight of said fuel.

25. The biomass fuel of claim 17 which comprises particles no greater in size than approximately ⅛ inch.

26. The biomass fuel of claim 17, wherein said bulking agent and said waste activated sludge are high in cellulose and protein, respectively, and approximately equal in heat content, whereby said waste activated sludge functions as a buffering agent to compensate for surges in quantity of said float sludge.

27. The biomass fuel of claim 18 which has a fuel value of approximately 11,000 Btu per pound.

* * * * *